(12) United States Patent
Zhang et al.

(10) Patent No.: US 11,708,953 B2
(45) Date of Patent: Jul. 25, 2023

(54) HEADLIGHT OPTICAL ELEMENT, HEADLIGHT MODULE, VEHICLE HEADLIGHT AND VEHICLE

(71) Applicant: HASCO VISION TECHNOLOGY CO., LTD., Shanghai (CN)

(72) Inventors: Dapan Zhang, Shanghai (CN); Zhiping Qiu, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 567 days.

(21) Appl. No.: 16/965,178

(22) PCT Filed: Sep. 16, 2019

(86) PCT No.: PCT/CN2019/105936
§ 371 (c)(1),
(2) Date: Jul. 27, 2020

(87) PCT Pub. No.: WO2020/244087
PCT Pub. Date: Dec. 10, 2020

(65) Prior Publication Data
US 2023/0160550 A1    May 25, 2023

(30) Foreign Application Priority Data

Jun. 5, 2019 (CN) .......................... 201910488336.X
Jun. 5, 2019 (CN) .......................... 201920859938.7
(Continued)

(51) Int. Cl.
*F21S 41/20*    (2018.01)
*F21S 41/19*    (2018.01)
(Continued)

(52) U.S. Cl.
CPC .......... *F21S 41/192* (2018.01); *B60Q 1/0408* (2013.01); *F21S 41/20* (2018.01); *F21S 41/43* (2018.01)

(58) Field of Classification Search
CPC .......... F21S 41/20; F21S 41/25; F21S 41/255; F21S 41/26; F21S 41/265; F21S 41/27;
(Continued)

(56) References Cited

U.S. PATENT DOCUMENTS

| 10,345,612 | B2* | 7/2019 | Gromfeld | ............. F21S 41/322 |
| 2017/0130923 | A1 | 5/2017 | Nishimura et al. | |
| 2018/0087745 | A1* | 3/2018 | Gromfeld | ................. F21V 5/04 |

FOREIGN PATENT DOCUMENTS

| CN | 1654880 A | 8/2005 |
| CN | 206419848 U | 8/2017 |

(Continued)

*Primary Examiner* — Robert J May
(74) *Attorney, Agent, or Firm* — Volpe Koenig

(57) ABSTRACT

The present disclosure relates to vehicle lighting devices, and discloses a headlight optical element. The headlight optical element includes a light incident portion, a light transmitting portion and a light emergent portion which are connected in sequence, wherein the light incident portion includes a plurality of light incident surfaces connected sequentially in a left-right direction; the light incident surfaces are curved surfaces protruding backwards in the optical axis direction; and light emergent surfaces are curved surfaces protruding forwards in the optical axis direction. In addition, the present disclosure further discloses a headlight module, a vehicle headlight and a vehicle. The headlight optical element provided by the present disclosure is small in size, high in optical precision, accurate in light pattern, convenient to mount and low in cost.

10 Claims, 6 Drawing Sheets

(30) Foreign Application Priority Data

Aug. 8, 2019 (CN) .......................... 201910730411.9
Aug. 22, 2019 (CN) .......................... 201910780214.8

(51) Int. Cl.
*F21S 41/43* (2018.01)
*B60Q 1/04* (2006.01)

(58) Field of Classification Search
CPC ...... F21S 41/275; F21S 41/322; F21S 41/143; F21S 41/29; F21S 41/295
See application file for complete search history.

(56) References Cited

FOREIGN PATENT DOCUMENTS

| | | |
|---|---|---|
| CN | 107388151 A | 11/2017 |
| CN | 107435836 A | 12/2017 |
| CN | 107740995 A | 2/2018 |
| CN | 207661691 U | 7/2018 |
| CN | 207975591 U | 10/2018 |
| CN | 109357235 A | 2/2019 |
| CN | 109611780 A | 4/2019 |

\* cited by examiner

HEADLIGHT OPTICAL ELEMENT, HEADLIGHT MODULE, VEHICLE HEADLIGHT AND VEHICLE

CROSS REFERENCE TO RELATED APPLICATIONS

This application is a 35 USC § 371 national stage of international application No. PCT/CN2019/105936, which was filed Sep. 16, 2019, claims priority to Chinese Application No. 201910488336.X, filed on Jun. 5, 2019; Chinese Application No. 201920859938.7, filed on Jun. 5, 2019; Chinese Application No. 201910730411.9, filed on Aug. 8, 2019; and Chinese Application No. 201910780214.8, filed on Aug. 22, 2019, and is entitled "HEADLIGHT OPTICAL ELEMENT, HEADLIGHT MODULE, VEHICLE HEADLIGHT AND VEHICLE," all of which are incorporated herein by reference as if fully set forth.

FIELD OF THE INVENTION

The present disclosure relates to vehicle lighting devices, in particular to a headlight optical element, and also relates to a headlight module, a vehicle headlight and a vehicle.

BACKGROUND OF THE INVENTION

For driving at night, the importance of vehicle lighting systems, especially headlights, is self-evident. When vehicles are running at a high speed, drivers may lose control of the vehicles due to dazzling high beams, and consequently unpredictable danger occurs. Vehicle headlights need to not only provide the drivers with a wide range of vision and good visual conditions, but also affect other road participants as little as possible without dazzling other road participants. With the development of technologies, matrix LED headlights have become one of future development trends for the vehicle headlights. Light sources of matrix LED high beams are composed of a plurality of LEDs which are arranged in an array pattern according to certain modes. Depending on positions of the vehicles and pedestrians in the field of vision in front of the vehicles, LEDs in the corresponding areas of the matrix LED headlights can be turned off, and thus dazzling of pedestrians or oncoming drivers is avoided.

In the prior art, a general matrix headlight module is provided with various optical elements. In order to ensure a light utilization rate and control a light pattern, all the optical elements are usually complicated in structure design and cannot be integrally formed easily, and the optical elements can only be processed and mounted separately, so that the problems of complicated mounting, large sizes of headlights and high manufacturing cost are caused. The Chinese patent for invention with the application number being CN109611780A discloses a motor vehicle high beam lighting module, wherein a condenser is a primary optical element of the module, a lens is a secondary optical element of the module, and the above condenser is composed of a plurality of collimation units, an emergent path of light is controlled through the collimation units, and therefore, the structure of the condenser is complicated, and separate production is reasonable. The Chinese patent for invention with the application number being CN109357235A discloses a matrix headlight system based on inverted LED white light chips. Each inverted LED white light chip is provided with a reflector correspondingly; a light guide column is arranged above each inverted LED white light chip correspondingly; light rays emitted by the corresponding inverted LED white light chips are gathered by the reflectors; and after the light rays are shaped by the corresponding light guide columns, rectangular light spots can be formed and then emitted through the lens. The reflectors, the light guide columns and the lens are matched with each other. Although the structures of the reflectors, the light guide columns and the lens are simple, the reflectors, the light guide columns and the lens cannot be integrally formed easily, and still need to be mounted separately.

Due to the fact that corresponding mounting brackets need to be arranged for separately mounting the optical elements, the structure of a headlight module is complicated, and the size of the headlight module is increased while the cost of the headlight module is increased. In the above Chinese patent for invention with the application number being CN109611780A, the mounting structure and mounting process of the headlight module are specifically described. Since the relative position precision between the various optical elements needs to be ensured so as to ensure the optical performance of the headlight, the manufacturing precision of the optical elements and the positioning and mounting precision of the headlight module are quite high. Therefore, special mounting structures such as mounting grooves and positioning grooves and special components for mounting the various optical elements, such as positioning columns, pressure plates and mounting brackets are needed, and the manufacturing cost is increased.

As mentioned above, in order to pursue a precise light pattern and diversified light pattern superposition modes, matrix headlights are often large and expensive. However, the matrix headlights are required to achieve an ADB function, the structures of the headlights need to be further simplified and the cost of the headlights needs to be reduced on the basis of the ADB function, and therefore, the price of the matrix headlights is more acceptable to the public.

In view of the above defects of the prior art, it is necessary to design a novel headlight optical element.

SUMMARY OF THE INVENTION

The first technical problem needing to be solved by the present disclosure is to provide a headlight optical element. The headlight optical element is not only small in size, but also high in optical precision, accurate in light pattern, convenient to mount and low in cost.

The second technical problem needing to be solved by the present disclosure is to provide a headlight module. The headlight module is not only small in size, but also high in optical precision, accurate in light pattern, simple in light adjusting, few in components, easy to mount and low in manufacturing cost and processing cost.

The third technical problem needing to be solved by the present disclosure is to provide a vehicle headlight. The vehicle headlight is small in size, high in optical precision, accurate in light pattern, simple in light adjusting, few in components, easy to mount, low in manufacturing cost and processing cost and diversified in light pattern superposition modes.

The fourth technical problem needing to be solved by the present disclosure is to provide a vehicle. The vehicle is small in vehicle headlight size, high in optical precision, accurate in light pattern, simple in light adjusting, few in components, easy to mount and low in manufacturing cost and processing cost.

In order to achieve the above objects, in the first aspect, the present disclosure provides a headlight optical element which includes a light incident portion, a light transmitting portion and a light emergent portion which are connected in sequence. The light incident portion includes a plurality of light incident surfaces connected in sequence in a left-right direction. The light incident surfaces are curved surfaces protruding backwards. Light emergent surfaces are curved surfaces protruding forwards.

Preferably, a contour of a front end surface of the light transmitting portion is located within a contour of a rear end portion of the light emergent portion, and thus a mounting surface can be formed on a rear end surface of the light emergent portion.

Preferably, a left side surface and a right side surface of the light transmitting portion extend forwards in an optical axis direction and then get closer to the optical axis direction.

As a preferred structural form of the present disclosure, heights of longitudinal sections of an upper side surface and a lower side surface of the light transmitting portion in the optical axis direction are gradually increased.

As a preferred structural form of the present disclosure, side surfaces of four sides of the light emergent portion get closer to the optical axis direction from back to front, and therefore light rays can be completely reflected to side surfaces of the light transmitting portion.

Preferably, extinction coatings or light shielding members are arranged on a surface of the light transmitting portion.

Specifically, the headlight optical element is integrally formed.

In the second aspect, the present disclosure provides a headlight module which includes a bracket, a circuit board provided with light sources, and a radiator, and further includes the headlight optical element according to any one of the technical solutions in the first aspect. The light transmitting portion of the headlight optical element is arranged in an accommodating cavity formed by the bracket, one end of the bracket is fixedly connected with the circuit board and the radiator sequentially, and the other end of the bracket is connected with the mounting surface of the light emergent portion.

Preferably, the bracket is of an integrated structure or a detachable structure so as to form the accommodating cavity for accommodating the light transmitting portion.

As a specific structural form, the headlight module further includes a light adjusting mechanism, and the light adjusting mechanism includes a first ball-headed screw, a second ball-headed screw, a third ball-headed screw, a fixing frame and ball-headed nuts corresponding to the ball-headed screws; the fixing frame and the radiator are connected through the ball-headed screws, wherein the line of centers of ball heads of the first ball-headed screw and the second ball-headed screw extends in a left-right direction, and the line of centers of ball heads of the second ball-headed screw and the third ball-headed screw extends in an up-down direction.

In the third aspect, the present disclosure provides a vehicle headlight which includes the headlight module according to any one of the technical solutions in the second aspect, and the headlight module is arranged longitudinally or horizontally or obliquely.

In the fourth aspect, the present disclosure provides a vehicle including the vehicle headlight according to any one of the technical solutions in the third aspect.

Through the basic technical solutions of the present disclosure, embodiments have the following beneficial effects:

1. the size is small. As the headlight optical element, only the corresponding light sources are required to output the required light pattern, optical elements at various levels required in traditional technical solutions are integrated, and thus the size is small;

2. mounting is simple. In addition to the light sources, there is only one headlight optical element. During mounting, it is only necessary to ensure the position precision between the headlight optical element and the light sources, a complicated optical system does not need to be adjusted, and thus the mounting process is simple;

3. the optical system has high precision. Only one headlight optical element needs to be arranged, separated primary optical element and lens do not need to be arranged, the structure of the headlight optical element is not complicated, the manufacturing precision of the headlight optical element is easy to guarantee. In the case that the manufacturing precision of the headlight optical element meets the requirement, during assembly, only the relative position precision of one optical element and the light sources needs to be ensured, and the relative position precision between a plurality of optical elements and the light sources does not need to be met, so that the optical system has high precision;

4. light adjusting difficulty is low. Only the relative position precision between one headlight optical element and the light sources needs to be ensured, compared with complicated optical systems which require much light adjusting design in the prior art, the optical system is low in light adjusting difficulty;

5. the costs are low. The structure is simple, the number of parts is small, and thus the manufacturing cost and the processing cost are low.

In addition, in preferred embodiments of the present disclosure, stray light is greatly eliminated. By arranging extinction coatings around the light transmitting portion or by arranging the peripheral side surfaces of the light transmitting portion as a low-reflectivity structure with a quite low reflectivity, arranging light shielding members, and meanwhile, arranging the peripheral side surfaces of the light emergent portion as total reflection surfaces, light rays cannot be emitted from the side surfaces of the headlight optical element, meanwhile, only a small part of light rays is emitted after being reflected by the side surfaces, the stray light is basically eliminated, and the quality of the light pattern is ensured.

The other advantages of the present disclosure and the technical effects of the preferred embodiments will be further described in the following specific embodiments.

BRIEF DESCRIPTION OF THE SYMBOLS

Figure 1:
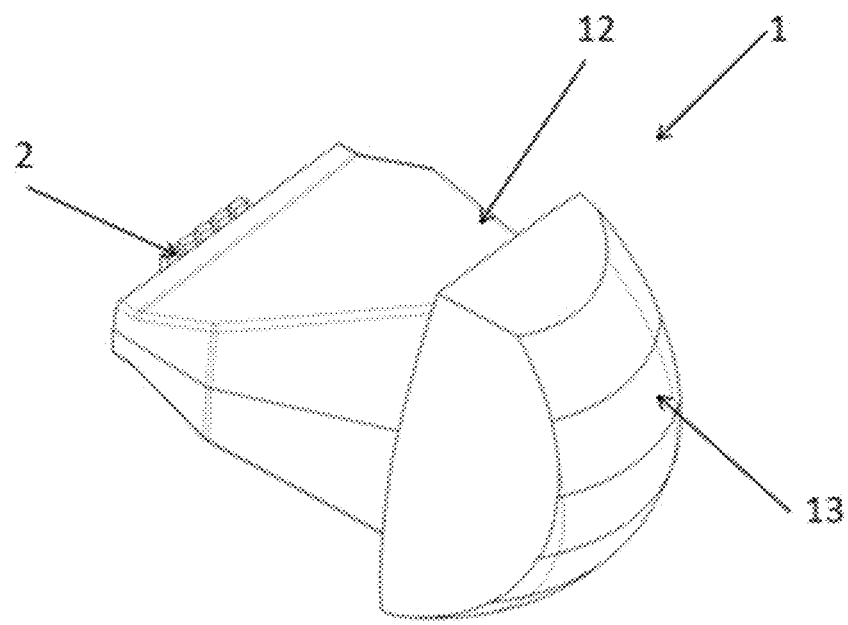
FIG. 1 is one of structural schematic diagrams of an embodiment of a headlight optical element according to the present disclosure.

1. Headlight optical element
12. Light transmitting portion
14. Light incident surfaces
16. Mounting surface
2. Light sources
4. Circuit board
6. Light adjusting mechanism
62. Second ball-headed screw
64. Ball-headed nuts
7. Positioning pins
11. Light incident portion
13. Light emergent portion
15. Light emergent surfaces
3. Bracket
5. Radiator
61. First ball-headed screw
63. Third ball-headed screw
65. Fixing frame
8. Threaded connecting members

DETAILED DESCRIPTION OF THE EMBODIMENTS

Hereunder the embodiments of the present disclosure will be described in detail, with reference to the accompanying drawings. It should be appreciated that the embodiments described here are only provided to describe and explain the present disclosure, but shall not be deemed as constituting any limitation to the present disclosure.

It should be noted that in the description of the present disclosure, the term "connection" should be understood in a broad sense, unless it is specifically stated and defined otherwise, for example, the connection may mean fixed connection or detachable connection or integral connection; the connection may mean direct connection or indirect connection through an intermediate medium; and the connection may mean internal connection of two elements or interaction between two elements. For ordinary those skilled in the art, the specific meanings of the above term in the present disclosure can be understood according to specific situations.

It should be understood that in the light emergent direction, "front" indicates the end where a light emergent portion is located, "rear" refers to the end where a light incident portion is located, "left" refers to the left side in the light emergent direction, and "right" refers to the right side in the light emergent direction, "up" refers to the up side in the light emergent direction, and "down" refers to the lower side in the light emergent direction. The terms are based on the orientation or position relationship shown in the drawings, and are only for the convenience of describing the present disclosure and simplifying the description, rather than indicating or implying that the device or element referred to may have a specific orientation, construction and operation in a specific orientation, and therefore the terms should not be construed as a limitation on the present disclosure.

Figure 2:
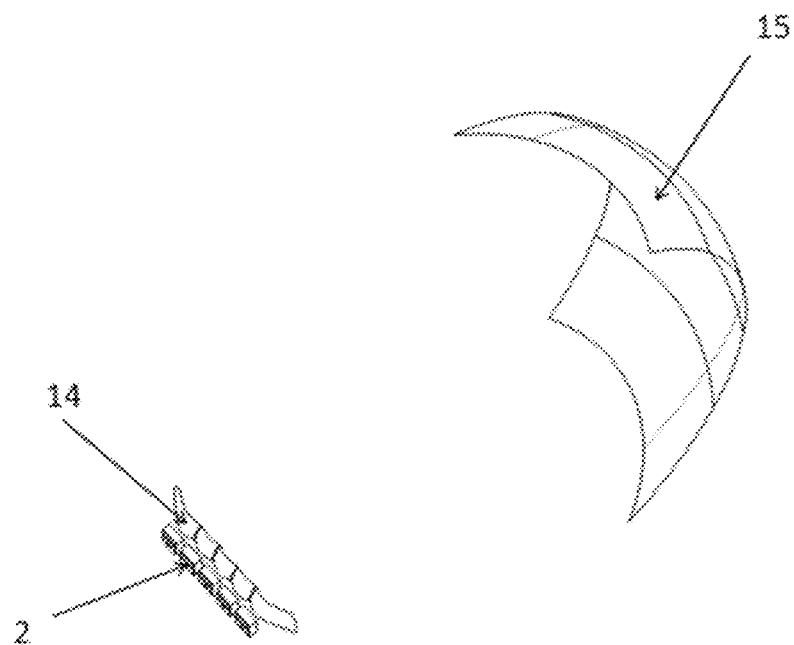
FIG. 2 is a structural schematic diagram of light incident surfaces and light emergent surfaces of an embodiment of a headlight optical element according to the present disclosure.
Figure 3:
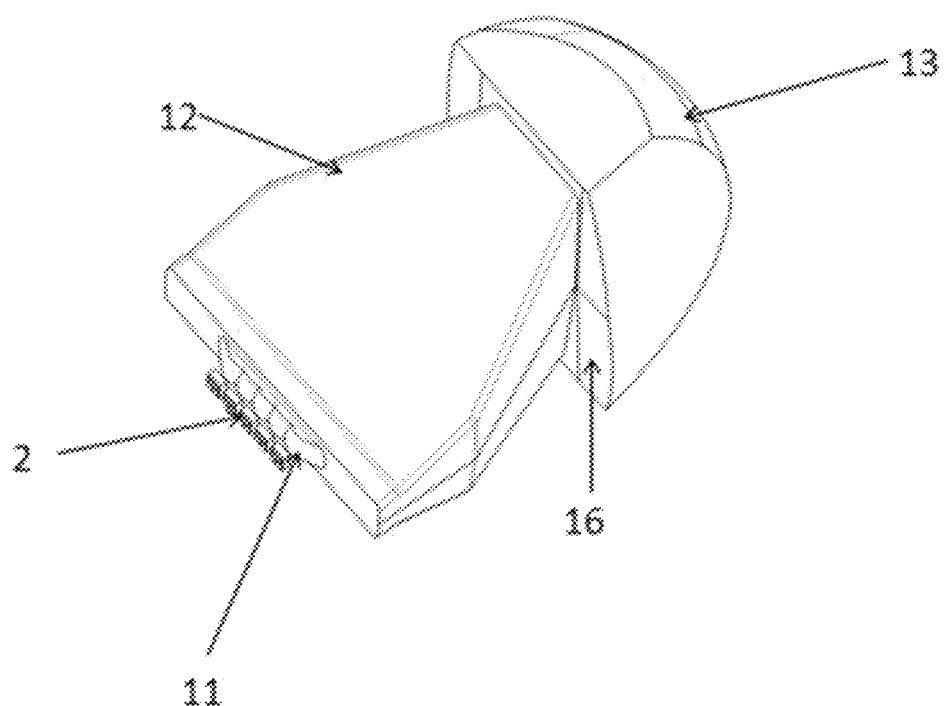
FIG. 3 is a second structural schematic diagram of an embodiment of a headlight optical element according to the present disclosure.

Referring to FIGS. 1-3, a headlight optical element in the basic technical solutions of the present disclosure includes a light incident portion 11, a light transmitting portion 12 and a light emergent portion 13 which are connected in sequence. The light incident portion 11 includes a plurality of light incident surfaces 14 connected in sequence in the left-right direction. The light incident surfaces 14 are curved surfaces protruding backwards. Light emergent surfaces 15 are curved surfaces protruding forwards.

In the above basic solutions, a focal point of each light incident surface 14 protruding backwards in the optical axis direction corresponds to a light source 2. Light rays enter the light emergent portion 13 through the light transmitting portion 12 after being collected by the light incident portion 11, and then are projected forwards through the light emergent portion 13. The light emergent portion 13 can be arranged as a latticed structure for facilitating light adjusting. The latticed structure is formed by connecting a plurality of protruding curved surfaces, and a light diffusion direction can be controlled by adjusting the sizes of lattices. Generally, the larger the area of a single lattice, the more obvious the light diffusion. The proper lattice area can be chosen according to actual needs for processing, the uniformity of the emergent light pattern is improved, and dispersion is weakened.

Figure 6:
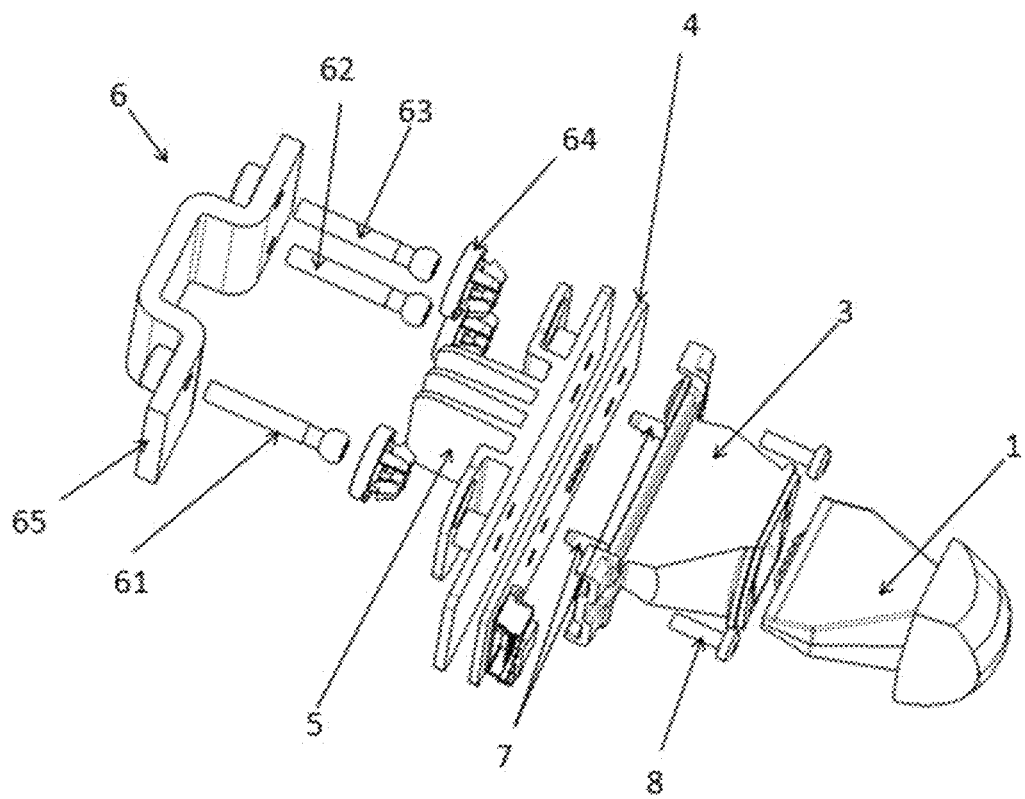
FIG. 6 is an exploded structural schematic view of an embodiment of a headlight module according to the present disclosure.
Figure 7:
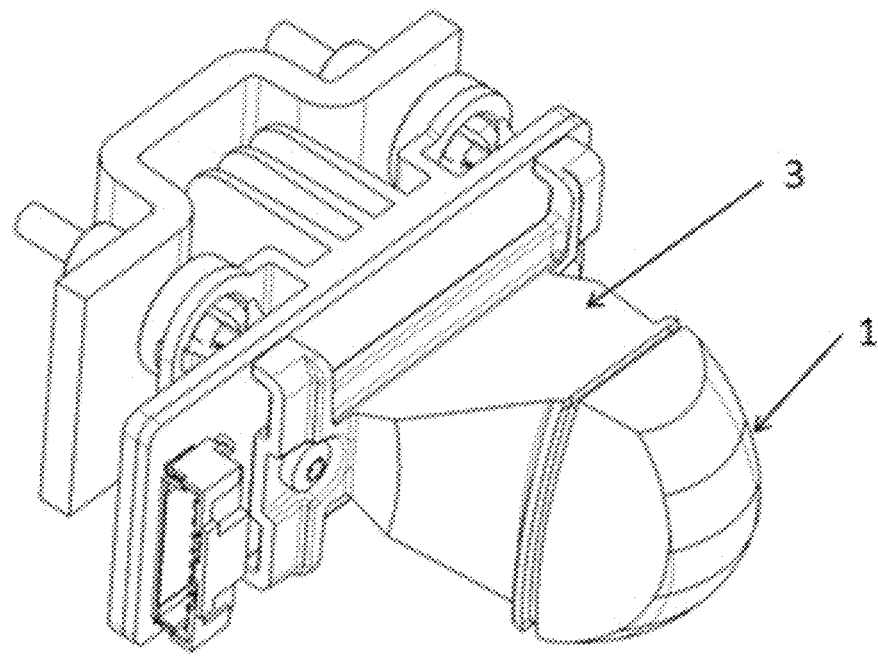
FIG. 7 is a structural schematic diagram of an embodiment of a headlight module according to the present disclosure.

Preferably, a contour of a front end surface of the light transmitting portion 12 is located within a contour of a rear end portion of the light emergent portion 13, so that a mounting surface 16 can be formed on a rear end surface of the light emergent portion 13. Referring to FIG. 3, FIG. 6 and FIG. 7, when the headlight optical element 1 is mounted inside a headlight module, the mounting surface 16 can be matched with a mounting bracket 3, thus, the appearance of the headlight module is more beautiful, and mounting is more convenient, in addition, a part of the light rays can be prevented from being emitted to the peripheral side surfaces of the light emergent portion 13, so that the situation that the part of light rays is emitted from the peripheral side surfaces of the light emergent portion 13 or reflected to the light emergent surfaces 15 of the light emergent portion 13 through the peripheral side surfaces of the light emergent portion 13 to form stray light is avoided.

Figure 4:
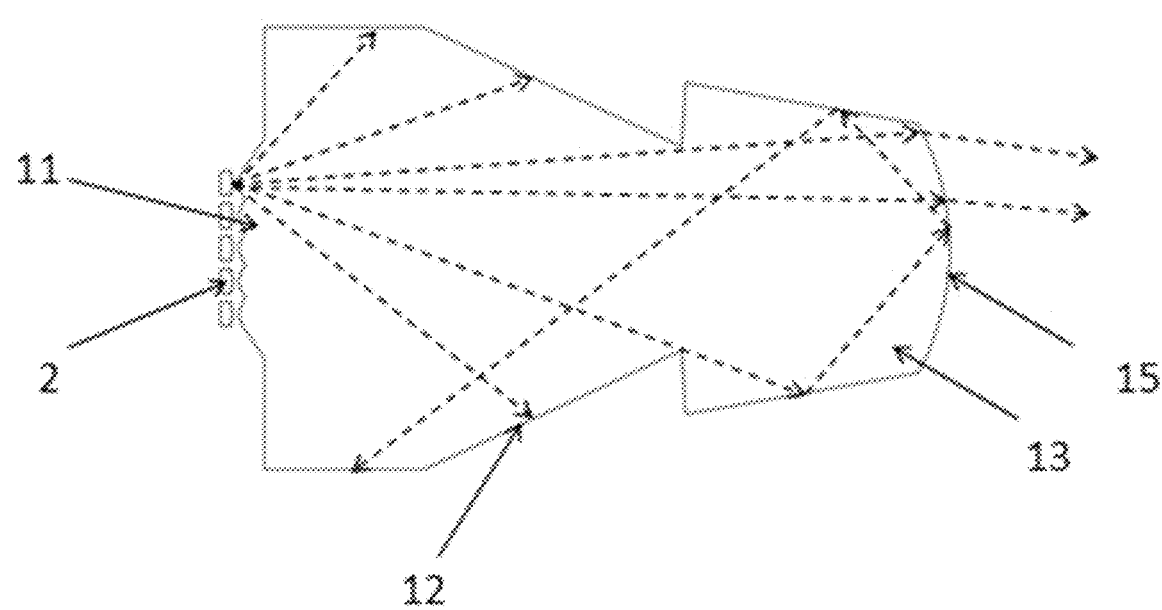
FIG. 4 is a transverse sectional view of an embodiment of a headlight optical element according to the present disclosure and a schematic diagram of a light path of an embodiment of a headlight optical element according to the present disclosure.

As a preferred structural form, referring to FIG. 4, a left side surface and a right side surface of the light transmitting portion 12 extend forwards in the optical axis direction and then get closer to the optical axis direction so as to form a low-reflectivity structure. In the light transmission process, part of light rays is usually emitted directly from the side surfaces of the headlight optical element 1 or reflected by the side surfaces and then refracted by the light emergent surfaces 15 of the light emergent portion 13 to form lots of stray light, and consequently the optical performance of the headlight light pattern is affected. According to the present disclosure, the light transmitting portion 12 is configured as the above low-reflectivity structure, and incident angles of light rays incident to the left side surface and the right side surface of the light transmitting portion 12 are small, so that the reflectivity of the left side surface and the right side surface of the light transmitting portion 12 is quite low. The possibility that the stray light is formed by the light rays which are emitted to the left side surface and the right side surface of the light transmitting portion 12 are reflected to the light emergent surfaces 15 of the light emergent portion 13 is effectively reduced.

Figure 5:
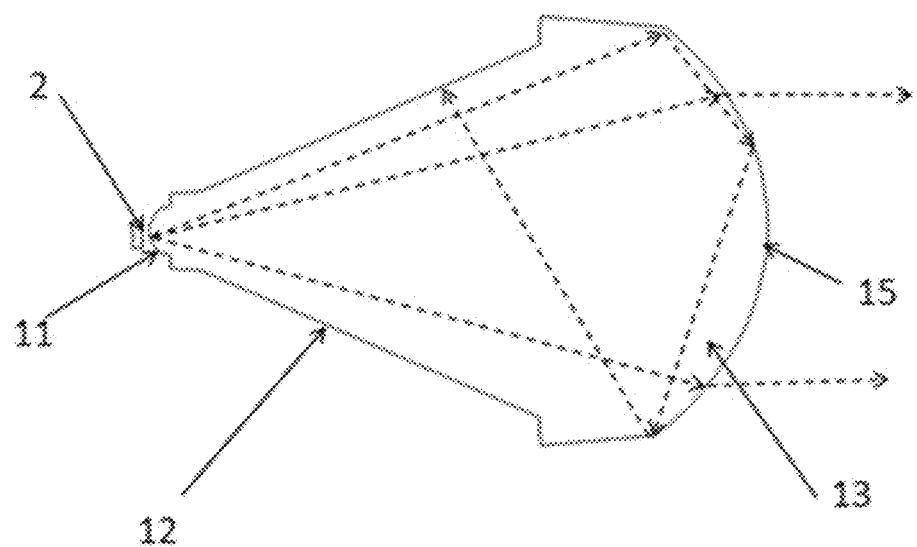
FIG. 5 is a longitudinal sectional view of an embodiment of a headlight optical element according to the present disclosure and a schematic diagram of a light path of an embodiment of a headlight optical element according to the present disclosure.

As another preferred structural form, referring to FIG. 5, heights of longitudinal sections of an upper side surface and a lower side surface of the light transmitting portion 12 in the optical axis direction are gradually increased to form a triangular-like structure. Since the light incident surfaces 14 of the light incident portion 11 are connected in a row in the left-right direction, the size of the rear end of the headlight optical element 1 in the up-down direction can be smaller, the material cost is reduced, and further the size of the headlight optical element 1 is further reduced. In the preferred structure, no light is emitted to the upper side surface and the lower side surface of the light transmitting portion 12 substantially, and therefore stray light reflected from the upper side surface and the lower side surface of the light transmitting portion 12 to the light emergent surfaces 15 of the light emergent portion 13 scarcely exists.

The structure of the above light transmitting portion 12 can block part of light rays emitted to the peripheral side surfaces of the light emergent portion 13, so that light rays emitted to the peripheral side surfaces of the light emergent portion 13 can be totally reflected. Further, the peripheral side surfaces of the light emergent portion 13 get closer to the optical axis direction from back to front so as to totally reflect the light rays totally reflected by the peripheral side surfaces to the opposite side surfaces of the light emergent portion 13 through the light emergent surfaces 15 of the light emergent portion 13 and finally totally reflect the light rays to the side surfaces of the light transmitting portion 12. As shown in FIG. 5, the light transmitting portion 12 with the above longitudinal sections emits most of light rays of light sources 2 directly through the light emergent surfaces 15 of the light emergent portion 13, and a small part of light rays is emitted to the side surfaces of the light emergent portion 13. The upper (lower) side surface of the light emergent portion 13 is arranged obliquely, so that the light rays totally reflected to the light emergent surfaces 15 through the upper (lower) surface of the light emergent portion 13 can be totally reflected to the lower (upper) side surface of the light emergent portion 13, and then be totally reflected to the upper (lower) side surface of the light transmitting portion 12 through the lower (upper) side surface of the light emergent portion 13, and since the incident angle is small, basically no light ray is reflected by the light emergent portion 13 to the light emergent surfaces 15 to avoid forming the stray light. As shown in FIG. 4, through the light transmitting portion 12 with the above transverse section, most of light rays of light sources 2 is directly emitted by the light emergent surfaces 15 of the light emergent portion 13, and a part of the light rays is emitted to the side surfaces of the light emergent portion 12, incident angles of light rays incident to the left side surface and right side surface of the light transmitting portion 12 are small, so that the side surface reflectivity is quite low, and the light rays emitted to the left side surface and the right side surface of the light transmitting portion 12 cannot be reflected into the light emergent portion 13; a part of light rays is emitted to the side surfaces of the light emergent portion 13, the left (right) side surface of the light emergent portion 13 is arranged obliquely, thus, the light rays totally reflected by the left (right) surface of the light emergent portion 13 to the light emergent surfaces 15 can be totally reflected to the right (left) side surface of the light emergent portion 13 and then totally reflected by the right (left) side surface of the light emergent portion 13 to the left (right) side surface of the light transmitting portion 12, and since the reflectivity of the left side surface and the right side surface of the light transmitting portion 12 is extremely low, basically no light ray is reflected by the left and right side surfaces of the light transmitting portion 12 to the light emergent surface 15 to avoid forming the stray light.

However, stray light refracted to the outside by the side surfaces of the light transmitting portion 12 cannot be effectively eliminated through the structure, and light shielding members can be arranged on the peripheral side surfaces of the light transmitting portion 12 to prevent light rays from being emitted to the outside. Alternatively, the side surfaces of the above light transmitting portion 12 are unnecessarily arranged as a low-reflectivity structure, only extinction coatings need to be arranged on the peripheral side surfaces of the light transmitting portion 12, and reflection and transmission of light rays from the side surfaces of the light transmitting portion 12 can be reduced through the extinction coatings. The extinction coatings can be coated with matte black paint, or surfaces of the extinction coatings can be provided with leather grains and coated with ordinary black paint.

It should be noted that the light transmitting portion 12 is not limited to the above structure. In order to meet the requirements of the headlight appearance or to further simplify the structure of the headlight optical element 1 for cost reduction, the light transmitting portion 12 can also be arranged in a rectangular or cylindrical shape. Alternatively, the above triangle-like structure, the low-reflectivity structure and common geometric structures such as a rectangle and a cylinder are optionally combined, and the extinction coatings or the light shielding members are arranged on the surfaces of the light transmitting portion 12 for eliminating the stray light.

Preferably, the headlight optical element 1 is integrally formed and may be made of transparent plastic, silica gel or glass. The plastic may be PMMA or PC. The light incident portion 11, the light transmitting portion 12 and the light emergent portion 13 of the headlight optical element 1 provided by the present disclosure are simple in structure and can meet the technical requirement of integral forming. The headlight optical element 1 is integrally formed, the relative position precision of the light incident portion 11 and the light emergent portion 13 is ensured, the mounting structure and the mounting process are simplified, and the manufacturing cost is reduced.

Referring to FIGS. 1-5, the headlight optical element 1 in a preferred embodiment of the present disclosure is integrally formed, and includes a light incident portion 11, a light transmitting portion 12 and a light emergent portion 13 which are connected in sequence. The light incident portion 11 includes a plurality of light incident surfaces 14 sequentially connected in the left-right direction. The light incident surfaces 14 are curved surfaces protruding backwards, and light emergent surfaces 15 are curved surfaces protruding forwards, wherein the light emergent surfaces 15 of the light emergent portion 13 can be arranged as a latticed structure for facilitating light adjusting. The contour of the front end surface of the light transmitting portion 12 is located within the contour of the rear end portion of the light emergent portion 13, so that a mounting surface 16 can be formed on the rear end surface of the light emergent portion 13. The mounting surface 16 is matched with a bracket 3 of a headlight module. The left side surface and the right side surface of the light transmitting portion 12 extend forwards in the optical axis direction, and then get closer to the optical axis direction, so as to a low-reflectivity structure. The heights of the longitudinal sections of the upper side surface and the lower side surface of the light transmitting portion 12 in the optical axis direction are gradually increased, so as to form a triangle-like structure, and light shielding members are arranged on the peripheral side surfaces of the light transmitting portion 12 so as to prevent light rays from being emitted from the side surfaces of the light transmitting portion 12 to the outside.

In the preferred embodiment, the structures of the light incident portion 11, the light transmitting portion 12 and the light emergent portion 13 of the headlight optical element 1 are relatively simple, so that the headlight optical element 1 can be integrally formed possibly. Compared with optical elements which adopt matched reflectors and light guide columns or condensers with complicated mounting structures or other modes for obtaining the accurate and clear light pattern in the prior art, the headlight optical element 1 is quite simple in structure, can be applied to matrix headlights like the above headlight optical elements, is matched with a control system and other headlight components for achieving the ADB function, and meanwhile, has the advantages of small size, low cost, convenient mounting and accurate light pattern.

A headlight module disclosed by the present disclosure, referring to FIG. 6, includes a bracket 3, a circuit board 4 provided with light sources 2, and a radiator 5, and further includes the headlight optical element 1 according to any one of the above technical solutions. A light transmitting portion 12 of the headlight optical element 1 is arranged in an accommodating cavity formed by the bracket 3. One end of the bracket 3 is fixedly connected with the circuit board 4 and the radiator 5 in sequence, and the other end of the bracket 3 is connected with a mounting surface 16 of a light emergent portion 13.

The light sources 2 correspond to focal points of light incident surfaces protruding backwards. Each light source 2 can be independently turned on and off, wherein LED light sources may be used as the light sources 2. One end of the bracket 3 is fixedly connected with the circuit board 4 and the radiator 5 in sequence through threaded connecting members 8. In order to facilitate positioning, positioning pins 7 are further arranged on the mounting bracket 3, and correspondingly, the circuit board 4 and the radiator 5 are provided with positioning holes matched with the positioning pins 7. The other end of the bracket 3 can be fixed to the mounting surface 16 through silica gel. The headlight module has a simple structure and fewer mounting parts. During the mounting process, only the positions of the light sources 2 relative to the headlight optical element 1 need to be ensured, so that the light adjusting difficulty is low.

Figure 8:
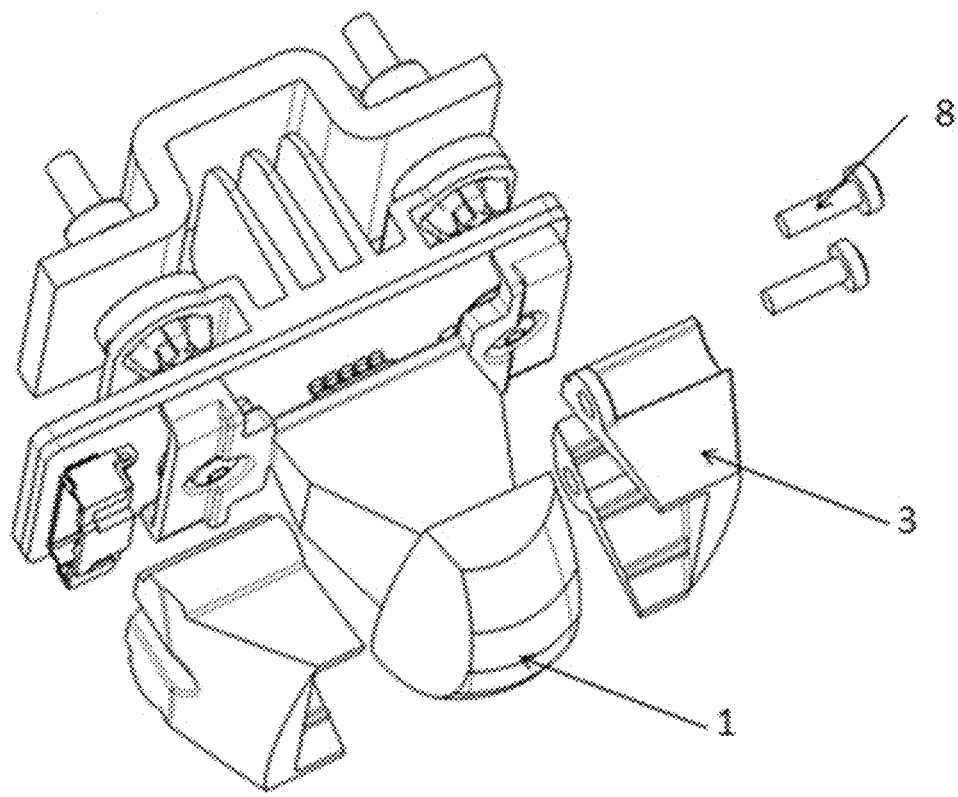
FIG. 8 is a structural schematic diagram of another embodiment of a headlight module according to the present disclosure.
Figure 9:
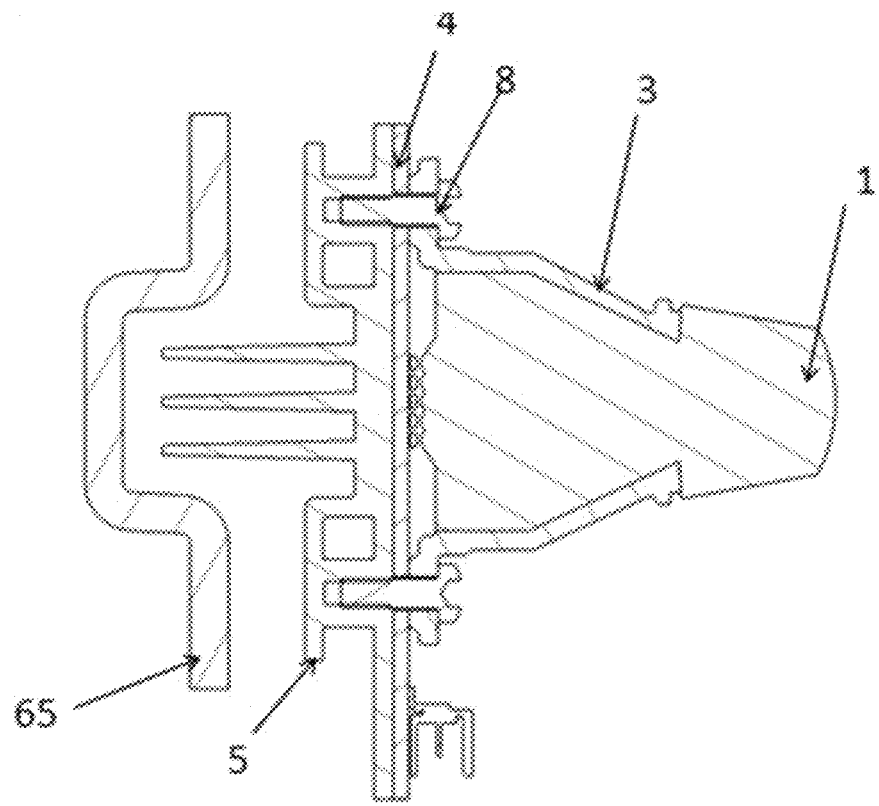
FIG. 9 is a transverse sectional view of an embodiment of a headlight module according to the present disclosure.
Figure 10:
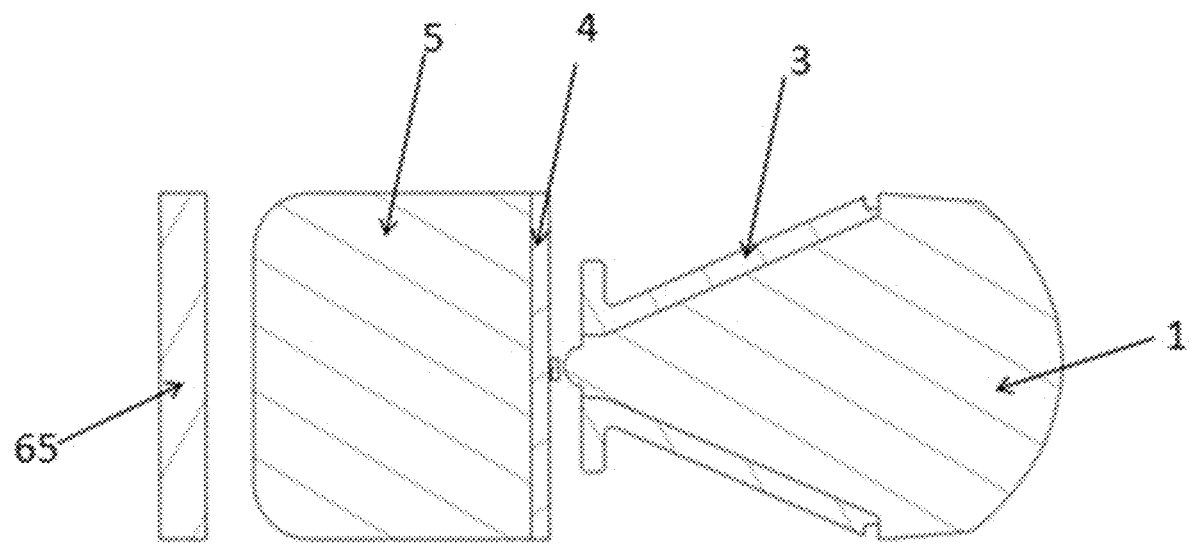
FIG. 10 is a longitudinal sectional view of an embodiment of a headlight module according to the present disclosure.
Figure 11:
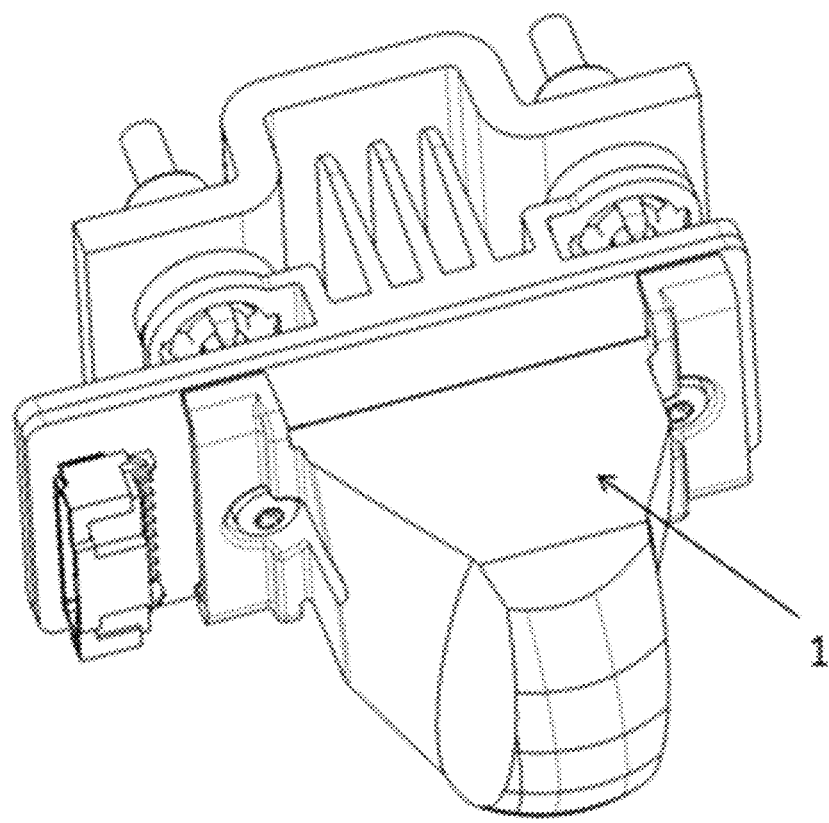
FIG. 11 is a structural schematic diagram of another embodiment of a headlight module according to the present disclosure.
Figure 12:
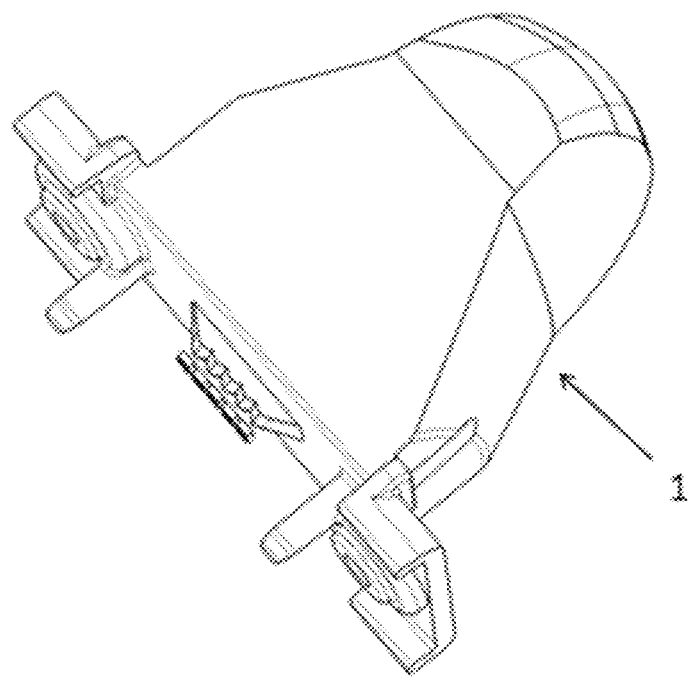
FIG. 12 is a structural schematic diagram of another embodiment of a headlight optical element according to the present disclosure.

Specifically, the bracket 3 is of an integrated structure or a detachable structure so as to form the accommodating cavity for accommodating the light transmitting portion 12. The bracket 3 can be matched with the above headlight optical element 1 in structure. If the light transmitting portion 12 of the headlight optical element 1 is of a rectangular or cylindrical structure and other structures, the bracket 3 may be of an integrated structure and can sleeve the light transmitting portion; if the light transmitting portion 12 of the headlight optical element 1 cannot be directly sleeved easily due to the structure, the bracket 3 may be of a detachable structure, as shown in FIG. 8, the accommodating cavity of the bracket 3 and the light transmitting portion 12 are matched in shape, the bracket 3 wraps the light transmitting portion 12 after being assembled, and then the detachable bracket 3 is fixed through the threaded connecting members 8 for stably supporting the headlight optical element 1. In order to prevent light rays from being emitted around the light transmitting portion 12, the bracket 3 can play the role of light shielding members, and the cost for arranging extinction coatings is saved through the bracket 3 made of a lighttight material. Further, referring to FIGS. 11 and 12, the above bracket 3 and the headlight optical element 1 can be made into a one-piece member so as to reduce the number of parts and facilitate assembly. In order to achieve the same effect of eliminating stray light, the one-piece member can be formed by bicolor injection molding. An outer side part of the bracket 3 is made of a light-absorbing material. The part of the bracket 3 can prevent light rays incident to the surfaces of the bracket 3 from being emitted out from the side surface, and meanwhile, through the headlight optical element 1 with the low-reflectivity side surfaces, stray light which is reflected by the side surfaces of the light transmitting portion 12 and then emitted out by the light emergent surfaces 15 of the light emergent portion 13 can be greatly reduced, wherein a black PC material may be used as a light-absorbing part material.

The headlight module further includes a light adjusting mechanism 6. The light adjusting mechanism 6 includes a first ball-headed screw 61, a second ball-headed screw 62, a third ball-headed screw 63, a fixing frame 65 and ball-headed nuts 64 corresponding to the ball-headed screws respectively; the fixing frame 65 and the radiator 5 are connected through the ball-headed screws, wherein the line of centers of ball heads of the first ball-headed screw 61 and the second ball-headed screw 62 extends in the left-right direction, and the line of centers of ball heads of the second ball-headed screw 62 and the third ball-headed screw 63 extends in the up-down direction. The light adjusting principle is as follows: by rotating the third ball-headed screw 63, the third ball-headed screw 63 can move back and forth, at this time, the first ball-headed screw 61 and the second ball-headed screw 62 are fixed, and the above headlight module can rotate with the line of centers of ball heads of the first ball-headed screw 61 and the second ball-headed screw 62 as the axis, so that up-down light adjusting is achieved; by rotating the first ball-headed screw 61, the first ball-headed screw 61 can move back and forth, at this time, the second ball-headed screw 62 and the third ball-headed screw 63 are fixed, and the above headlight module can rotate with the line of centers of ball heads of the second ball-headed screw 62 and the third ball-headed screw 63 as the axis, so that left-right light adjusting is achieved. Through the light adjusting mechanism 6, the light adjusting difficulty of the headlight module is further lowered.

Referring to FIGS. 6-10, a headlight module in a preferred embodiment of the present disclosure includes a bracket 3, a circuit board 4 provided with light sources 2, a radiator 5, and the headlight optical element 1 according to any one of the above technical solutions. The detachable separated type bracket 3 is fixed through screws after tightly wrapping a light transmitting portion 12 of the headlight optical element 1. Positioning pins 7 on the bracket 3 are inserted into positioning holes in the circuit board 4 and the radiator 5 for preliminary positioning. One end of the bracket 3 is fixedly connected with the circuit board 4 and the radiator 5 in sequence through threaded connecting members 8, and the other end of the bracket 3 is connected with a mounting surface 15 of the headlight optical element 1 through silica gel. The headlight module further includes a light adjusting mechanism 6. One ends of three ball-headed screws are mounted on the radiator 5 through ball-headed nuts 64, and the other ends of the three ball-headed screws are connected with a fixing frame 65. The light adjusting function is achieved by adjusting the ball-headed screws. In this way, by virtue of the headlight optical element 1 of the present disclosure, the headlight module has fewer parts, and is high in compaction, high in integration degree and small in overall volume; as only the relative position relation of the headlight optical element 1 and the light sources 2 needs to be ensured, mounting is more convenient; as only one headlight optical element 1 needs to be arranged, the structure of the headlight optical element 1 is not complicated, and the manufacturing precision of the headlight optical element 1 is easy to guarantee, an optical system has high precision; and as the headlight module has simple parts and structure, as well as small part number, so that the manufacturing cost is low.

A vehicle headlight disclosed by the present disclosure includes the headlight module according to any one of the above technical solutions. The headlight module is arranged longitudinally or horizontally or obliquely so as to meet different headlight modeling requirements. In cooperation with an on-board sensor system, the on-board system automatically and individually controls LED light sources in the headlight module to be turned on and off, a high beam lighting area is subdivided into a plurality of lighting areas, and when the on-board sensor system detects oncoming vehicles on an opposite lane of a road, the LED light sources in the corresponding areas are turned off, so that dazzling caused by high beams is effectively prevented, and a good lighting effect on other areas of the road is achieved. Meanwhile, the bracket 3 of the headlight module is only arranged around the light transmitting portion 12, only the light emergent portion 13 is exposed, and the transparency and attractiveness of the exposed portion of the headlight are ensured.

A vehicle disclosed by the present disclosure includes the vehicle headlight according to any one of the above technical solutions, and adopts the technical solutions of the above embodiments, and therefore the vehicle has at least the beneficial effects achieved by the technical solutions of the above embodiments.

While the preferred embodiments of the present disclosure are described above in details with reference to the accompanying drawings, the present disclosure is not limited thereto. Within the scope of the technical conception of the present disclosure, a variety of simple modifications can be made to the technical solutions of the present disclosure, including combinations of specific technical features in any proper manner. In order to avoid unnecessary repetition, various possible combinations are not described separately in the present disclosure. However, the simple modifications and combinations may also be regarded as the content disclosed by the present disclosure, and fall into the protection scope of the present disclosure.

The invention claimed is:

1. A headlight optical element comprising a light incident portion, a light transmitting portion and a light emergent portion which are connected in sequence, wherein the light incident portion comprises a plurality of light incident surfaces connected sequentially in a left-right direction; the light incident surfaces are curved surfaces protruding backwards; and a light emergent surface of the light emergent portion is a curved surface protruding forwards; a left side surface and a right side surface of the light transmitting portion extend forwards in an optical axis direction and then get closer to the optical axis; and heights of longitudinal sections of an upper side surface and a lower side surface of the light transmitting portion in the optical axis direction are gradually increased.

2. The headlight optical element according to claim 1, wherein a contour of a front end surface of the light transmitting portion is located in the scope of a contour of a rear end portion of the light emergent portion, so that a mounting surface is formed on a rear end surface of the light emergent portion.

3. The headlight optical element according to claim 1, wherein peripheral side surfaces of the light emergent portion get closer to an optical axis direction from back to front so as to totally reflect light rays to side surfaces of the light transmitting portion.

4. The headlight optical element according to claim 1, wherein surfaces of the light transmitting portion are provided with an extinction coating or a light shielding member.

5. The headlight optical element according to claim 1, wherein the headlight optical element is integrally formed.

6. A headlight module comprising a bracket, a circuit board provided with light sources and a radiator, and further comprising the headlight optical element according to any one of claim 1, wherein the light transmitting portion of the headlight optical element is arranged in an accommodating cavity formed by the bracket, one end of the bracket is fixedly connected with the circuit board and the radiator in sequence, and the other end of the bracket is connected with a mounting surface of the light emergent portion.

7. The headlight module according to claim 6, wherein the bracket is of an integrated structure or a detachable structure so as to form an accommodating cavity for accommodating the light transmitting portion.

8. The headlight module according to claim 6, wherein further comprising a light adjusting mechanism, the light adjusting mechanism comprises a first ball-headed screw, a second ball-headed screw, a third ball-headed screw, a fixing frame and ball-headed nuts corresponding to the ball-headed screws respectively; the fixing frame and the radiator are connected through the ball-headed screws, a line of centers of ball heads of the first ball-headed screw and the second ball-headed screw extends in a left-right direction, and a line of centers of ball heads of the second ball-headed screw and the third ball-headed screw extends in an up-down direction.

9. A vehicle headlight comprising at least one headlight module according to claim 6, wherein the headlight module is distributed longitudinally or horizontally or obliquely.

10. A vehicle comprising the vehicle headlight according to claim 9.

* * * * *